(12) United States Patent
Hughes

(10) Patent No.: US 8,528,326 B2
(45) Date of Patent: Sep. 10, 2013

(54) RECIPROCATING WATER DISPLACEMENT GRAVITY ENGINE

(75) Inventor: Brian J. Hughes, Bremerton, WA (US)

(73) Assignee: Brian J. Hughes, Bremerton, WA (US)

( * ) Notice: Subject to any disclaimer, the term of this patent is extended or adjusted under 35 U.S.C. 154(b) by 295 days.

(21) Appl. No.: 12/987,769

(22) Filed: Jan. 10, 2011

(65) Prior Publication Data

US 2011/0185720 A1    Aug. 4, 2011

Related U.S. Application Data

(60) Provisional application No. 61/300,741, filed on Feb. 2, 2010.

(51) Int. Cl.
*F03B 13/18*    (2006.01)

(52) U.S. Cl.
USPC .................. 60/497; 60/507; 60/516

(58) Field of Classification Search
USPC ............................ 60/495, 497, 507
See application file for complete search history.

(56) References Cited

U.S. PATENT DOCUMENTS

| | | | | |
|---|---|---|---|---|
| 3,668,412 A | * | 6/1972 | Vrana et al. | 290/53 |
| 4,598,547 A | * | 7/1986 | Danihel | 60/507 |
| 6,803,670 B2 | * | 10/2004 | Peloquin | 290/53 |
| 2005/0144942 A1 | * | 7/2005 | Suleiman | 60/516 |

* cited by examiner

*Primary Examiner* — Thomas Denion
*Assistant Examiner* — Philip Eklem
(74) *Attorney, Agent, or Firm* — Kevin D. Jablonski; Graybeal Jackson LLP

(57) ABSTRACT

A reciprocating water displacement gravity engine is shown and described herein.

15 Claims, 8 Drawing Sheets

RECIPROCATING WATER DISPLACEMENT GRAVITY ENGINE

PRIORITY CLAIM

This application claims the benefit of U.S. Provisional Application No. 61/300,741 filed on Feb. 2, 2010, which is incorporated herein by reference in its entirety for all purposes.

FIELD

The present disclosure relates to engines, and specifically to systems and methods for providing a reciprocating water displacement gravity engine.

BACKGROUND

Because the supply of fossil fuels, natural gas, and other natural energy sources is finite, and because the processing and/or consumption of such fuels produces significant amounts of detrimental pollution, alternatives to such fuels have been saught, and in some cases implemented over the years. However, such alternative energy sources are not cost effective and rely on materials that are not renewable or not readily available for consumption. Accordingly, there is a need for alternative energy systems and methods for harnessing the power of such alternative energy sources.

For hundreds of years, water powered machines have been used that harness the energy of flowing or falling water as the driving force for work machines. Examples include mills, water lifting machines, and the like. Contemporary water driven turbines produce electric power from water flowing past turbines and thereby capture energy. Unfortunately, such water turbines lack efficiency and fail to take advantage of buoyancy. Additionally, hydroelectric dams, which operate with such water turbines, are extremely expensive to build and maintain, and therefore cannot be implemented rapidly and in areas where capital is not available to fund such projects.

SUMMARY

Disclosed in one embodiment is a reciprocating water displacement gravity engine that comprises a plurality of sequentially connected tanks, where each subsequent tank is lower in elevation than the previous tank. Each tank comprises a float that is coupled to a double-ratchet con rod, and as water entering and leaving each tank causes the floats to rise and fall, torque is thereby continuously applied to the con rod or shaft in both the up-stroke and down-stroke of the moving floats. Accordingly, the shaft continuously rotates and this rotational energy can be captured in the form of electric energy or used to drive a vehicle such as a ship.

Further embodiments include a reciprocating static water displacement gravity engine wherein a float rises and falls within a tank of water due to varying water level within the tank, which is caused by the introduction and discharge of air from a displacement chamber within the tank. Air can be introduced to the displacement chamber via an air compressor, and the air compressor may be powered by wind turbines. Still further embodiments include a reciprocating-water-gravity-engine ship that is powered by water surrounding the ship.

DETAILED DESCRIPTION

Figure 1:
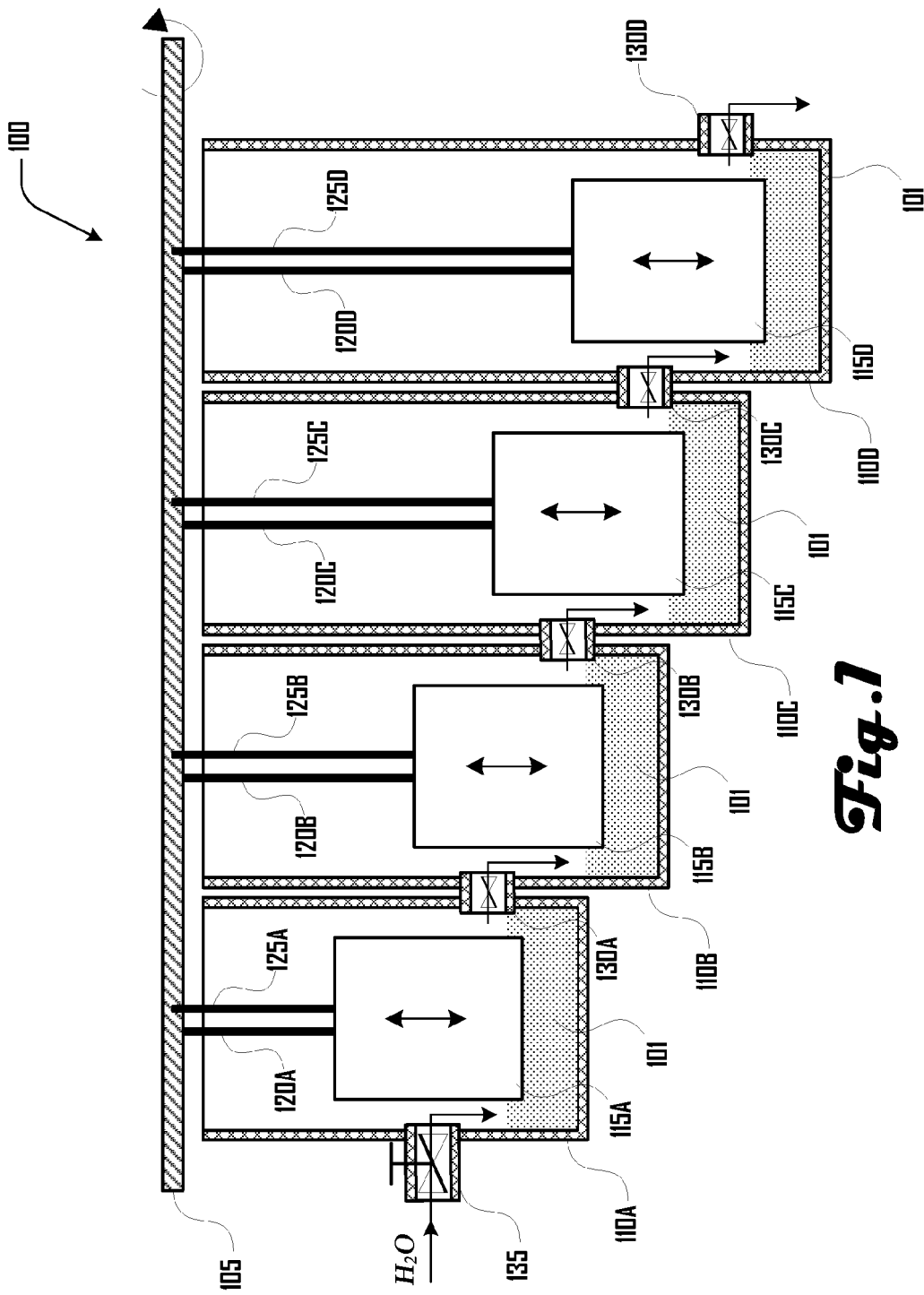
FIG. 1 is an illustration of a reciprocating water displacement gravity engine in accordance with an embodiment.

Now referring to FIG. 1, a reciprocating water displacement gravity engine 100 is depicted that comprises a plurality of tanks 110 that are positioned at increasingly lower elevations. Within each tank 110 is a float 115, which is connected to a shaft 105 by a pull-rod 120 and a push-rod 125. The tanks are interconnected by a flush-value 130 and a final flush-valve 130D serves as a terminal drain for the system. Additionally, an inlet valve 135 is connected to the first tank 110A and may be a source for water 101 entering the reciprocating water displacement gravity engine 100. Each tank 110 comprises water 101 in the bottom portion of the tank 110, on which the float 115 rests due to buoyancy.

Figure 2:
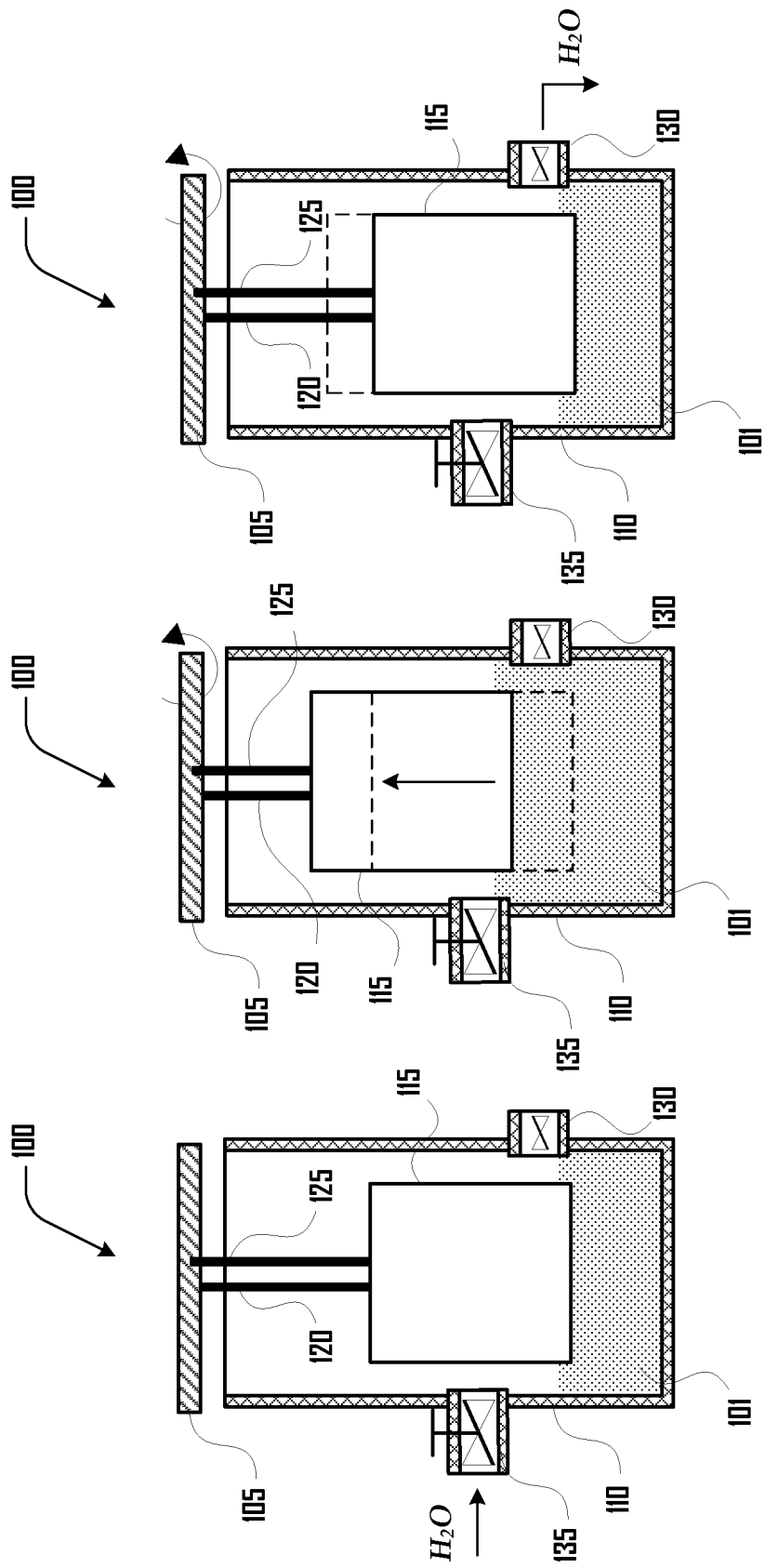
FIG. 2a is an illustration of a reciprocating water displacement gravity engine in a first stage of a cycle in accordance with an embodiment.
FIG. 2b is an illustration of a reciprocating water displacement gravity engine in a second stage of a cycle in accordance with an embodiment.
FIG. 2c is an illustration of a reciprocating water displacement gravity engine in a third stage of a cycle in accordance with an embodiment.

As discussed in more detail in relation to FIGS. 2a, 2b, and 2c. Additional water 101 can enter and fill a portion of the first tank 110A and thereby cause the first float 115A to rise due to buoyancy. At a defined point, the water 101 in the first tank 110A is discharged via the first flush-valve 130A into the second tank 110B, which thereby causes the second float 115B to rise due to buoyancy. At the same time, the water 101 leaving the first tank 110A allows the first float 115A to fall to its resting float position due to gravity. A certain volume of water 101 remains in the tank 110 below the flush-valve 130, which defines the resting float position.

Accordingly, the same volume of water 101 may travel sequentially through the first, second, third and fourth tank 110A, 110B, 110C, 110D and thereby cause each float 115 to rise and fall once. As a float 115 both rises and falls, this energy is transferred into rotational energy in the shaft 105 as described in more detail herein. Therefore, by providing a source of water via the inlet valve 135, continuous rotation of the shaft 105 may be achieved. Rotational energy of the shaft 105 can be applied to a multitude of applications including powering vehicles or electric power generators.

Referring again FIG. 1, various elements are now described in further detail. The float 115 may be various buoyant bodies and may be various weights. For example, the float 115 may be sufficiently buoyant such that it rises with a desired force when the tank 110 is filled with water 205, and may have sufficient mass so that gravity will pull the float 115 with a desired force when the tank 110 is emptied of water 101.

In one embodiment, the inlet-valve 135 and flush-valves 130 may be multi-port slide valves. However, any suitable valve may be used in other embodiments. For example, other types of valves may include: a ball valve, butterfly valve, choke valve, check valve, diaphragm valve, gate valve, globe valve, and the like.

Additionally, the flush-valves 130 may be triggered via a water-height switch (not shown), which initiates draining of the tank 110 when water 101 reaches a defined height within the tank 110. In some embodiments, flush-valves 130 may be initiated by any suitable mechanism, which may trigger the flush-valve based on water height within the tank, water pressure, time, and the like.

As discussed above, the float 115 is connected to the shaft 105 by the pull-rod 120 and the push-rod 125. The pull-rod 120 and the push-rod 125 may be various suitable structures and may be coupled to the shaft 105 via ratchets so that upward force applied to the push-rod 125 turns the shaft 105 in the same direction as when force is applied to the pull-rod 120. Additionally, the shaft 105 may be a freewheel, such that it may turn regardless of whether force is being applied to the shaft 105 or not. This is described and illustrated in further detail in FIG. 3.

In some embodiments, the tanks 110 themselves may not be at sequentially lower elevations, and a change in elevation required to allow a volume of water to pass from tank 110 to tank 110 can be achieved by varying heights of flush-valves 130 and the inlet-valve 135. Additionally, in some embodiments, water 101 may pass between alternating tanks 110 instead of sequentially through tanks 110. For example, in an embodiment, water 101 may pass from the first tank 110A to third tank 110C, and water 101 may pass from the second tank 110B to the fourth tank 110D.

Referring now to FIGS. 2a, 2b, and 2c. A series of stages in the functioning of a reciprocating water displacement gravity engine 100 are depicted. Specifically, FIG. 2a depicts a first stage with a float 115 in a resting float state, where the float 115 is floating within the volume of water 101 in the bottom of the tank 110. Additional water 101 begins to flow into the tank 110 and begins to further fill the tank 110. The float 115 immediately begins to rise due to buoyancy within the additional volume of water 101.

FIG. 2b depicts a second stage wherein additional water 101 has filled the tank 110 to a defined level. The float 115 rises due to buoyancy and applies an upward force to both the pull-rod 120 and the push-rod 125. However, only the push rod 125 applies energy to the shaft 105 because the orientation of a ratchet 310A (FIG. 3) associated with the push-rod 125 allows energy to be applied to the shaft 105, whereas the orientation of a ratchet 310B associated with the pull rod 120 does not apply force to the shaft 105. Upon reaching a defined height within the tank 110, the flush-valve 130 is initiated and the additional water 101 is discharged from the tank 110, leaving only water 101 in the bottom of the tank 110.

FIG. 2c depicts a third stage wherein additional water 101 is discharged from the tank 110 and the float 115 falls under the force of gravity back to a resting float state in the water 101 at the bottom of the tank 110. As the float 115 falls, the pull-rod 120 applies torque to the shaft 105 and further causes the shaft 105 to rotate. The ratchets 310 associated with pull-rod 120 and the push-rod 125 only allow force to be applied by the pull-rod 120 when the float 115 is falling.

Additionally, as discussed above in relation to FIG. 1, discharged water 101 may be used to fill any number of subsequent tanks 110 below the tank 110 being discharged. Various embodiments may have any suitable number of tanks 110 and floats 115. Also, in some embodiments, a series of tanks 110 may be placed in parallel. For example, it may be desirable to selectively configure a reciprocating water displacement gravity engine 100 to accommodate situations where there is great elevation change over a short distance or little elevation change over a large distance, and the like. Furthermore, a reciprocating water displacement gravity engine 100 in accordance with various embodiments may be modular.

In one embodiment, a float 115 or other portion of a system described herein may comprise additional energy-generation elements. For example, a float may comprise a "shake" or Faraday-electric-energy-generation body. In other words, a float 115 or other structure may include a magnet that is operable to repetitively pass through a coil, and thereby induce an electrical current in the coil. Such electrical current may then be stored in a capacitor or other suitable energy storage device.

Figure 3:
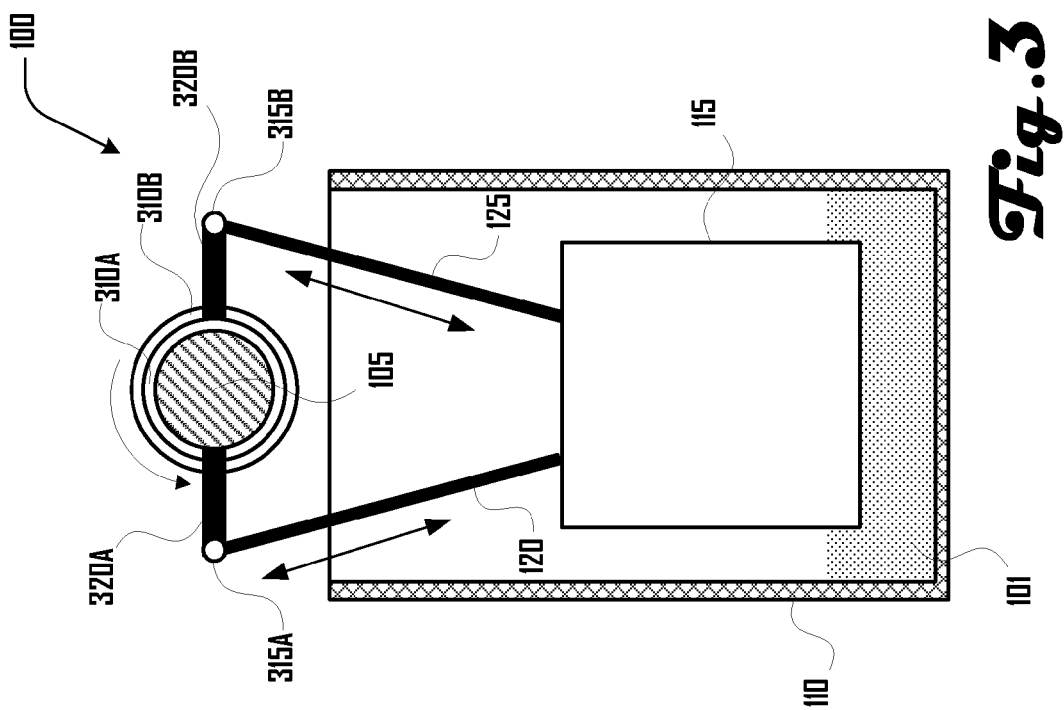
FIG. 3 is a side view of a reciprocating water displacement gravity engine in accordance with an embodiment.

FIG. 3 illustrates a side view of a reciprocating water displacement gravity engine 100 showing an example of ratchets 310 that allow torque to be applied to the shaft 105 in the same direction in both the up and down stroke of the float 115 within the tank 110. It should be appreciated that any suitable ratchet mechanism may be implemented, and that the ratchets 310 depicted in FIG. 3 are used only for purposes of illustration.

Referring to FIG. 3, the pull-rod 120 is coupled with a counter-clockwise ratchet 310A via a first arm 320A, and first axle 315A which allows the ratchet 310A to apply counter-clockwise torque to the shaft 105 when downward force is applied by the float 115, but not when upward force is applied. The push-rod 125 is coupled with another counter-clockwise ratchet 310B via a second arm 320B, and second axle 315B, which allows the ratchet 310B to apply counter-clockwise torque to the shaft 105 when upward force is applied by the float 115, but not when downward force is applied.

Figure 4:
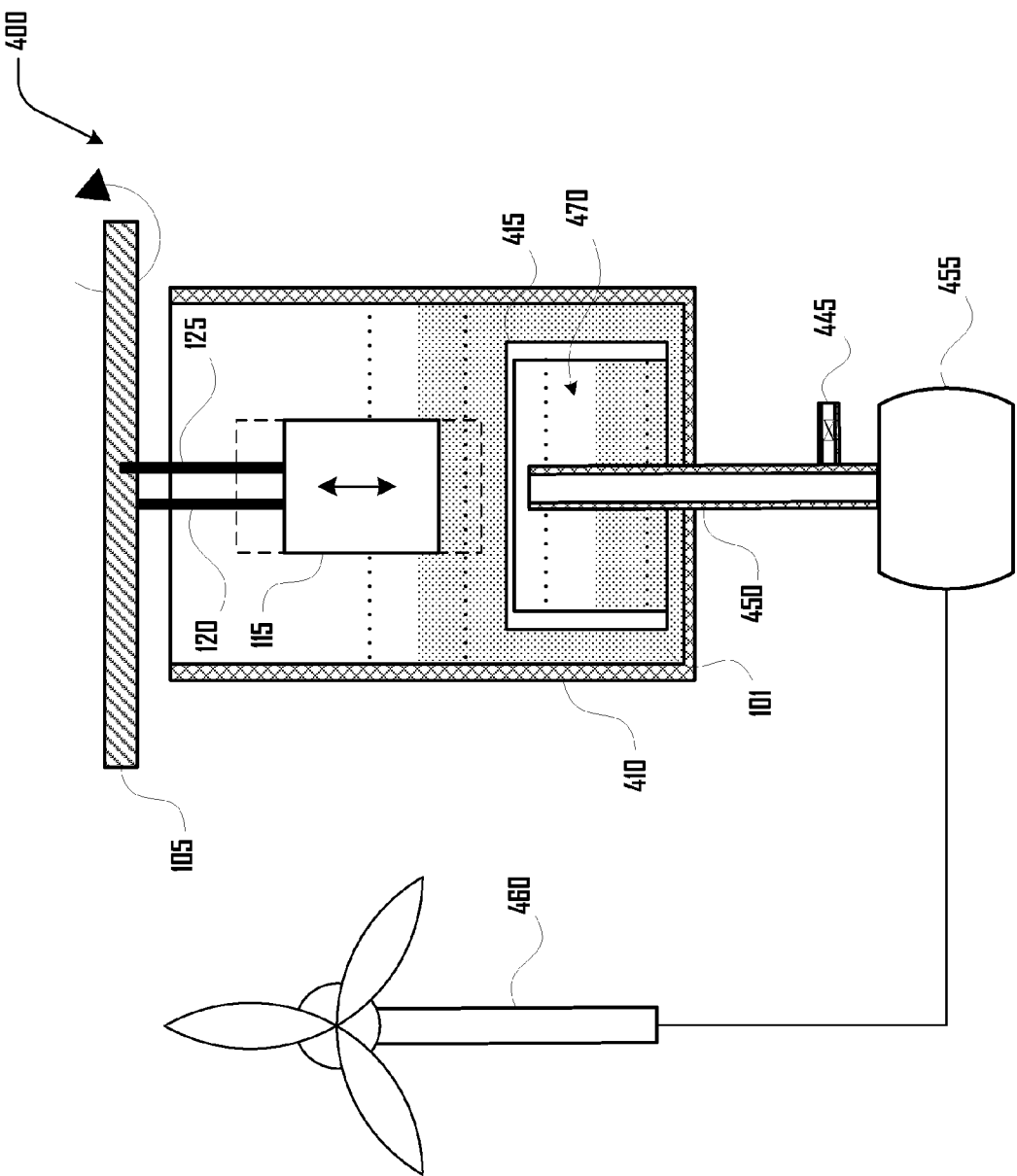
FIG. 4 is an illustration of a reciprocating static water displacement gravity engine powered by compressed air, in accordance with an embodiment.

Now referring to FIG. 4, a reciprocating static water displacement gravity engine powered by compressed air is illustrated, in accordance with an embodiment 400. This embodiment 400 includes a displacement chamber 415 with an internal cavity 470 that is fixed in place within a tank 410 that is filled with water 101. Also, as similarly discussed in the previous FIGS., a float 115 is coupled to a shaft 105 via a pull-rod 120 and a push-rod 125.

At a bottom portion of the tank 410, an air-tube 450 introduces air into the internal cavity 470 of the displacement chamber 415, where the air partially fills the internal cavity 470 of the displacement chamber 415 and thereby displaces water 101 that is present within the displacement chamber 415. The air may be produced by an air-compressor 455, which may be powered by one or more wind turbines 460. Along a portion of the air-tube 450, there is an air-discharge port 445 that is configured to selectively release air from the internal cavity 470.

Accordingly, because the interconnected volume of water within the tank 110 and the displacement chamber 415 remains fixed, a volume of air that fills the displacement chamber 415 and is released from the displacement chamber 415 causes the level of the water within the tank 410 to rise and fall.

As shown FIG. 4, the float 115 may move up and down within the tank 410 in accordance with the change in water level caused by the water displacement within the displacement chamber 415. Accordingly, the float 115 may be raised and lowered within the tank 410 at a desired rate based on the rate at which air is introduced and released from the displacement chamber 415, and thereby apply torque to the shaft 105 as discussed herein.

Also, in various embodiments, the air-compressor 455 may be powered by one or more wind turbines 460. For example, one or more wind turbines may be associated with one or more tanks 410 and float 115 pair. Accordingly, there may be a plurality of pairs of tank 410 and float 115 associated with a shaft 105, which may be supported by one or more wind turbines 460 for introducing air into the displacement chamber 415, or the like. In further embodiments, air may be introduced to the internal cavity 470 via various suitable ways. For example, a hand pump or a dark tank with a vacuum-breaker.

Figure 5:
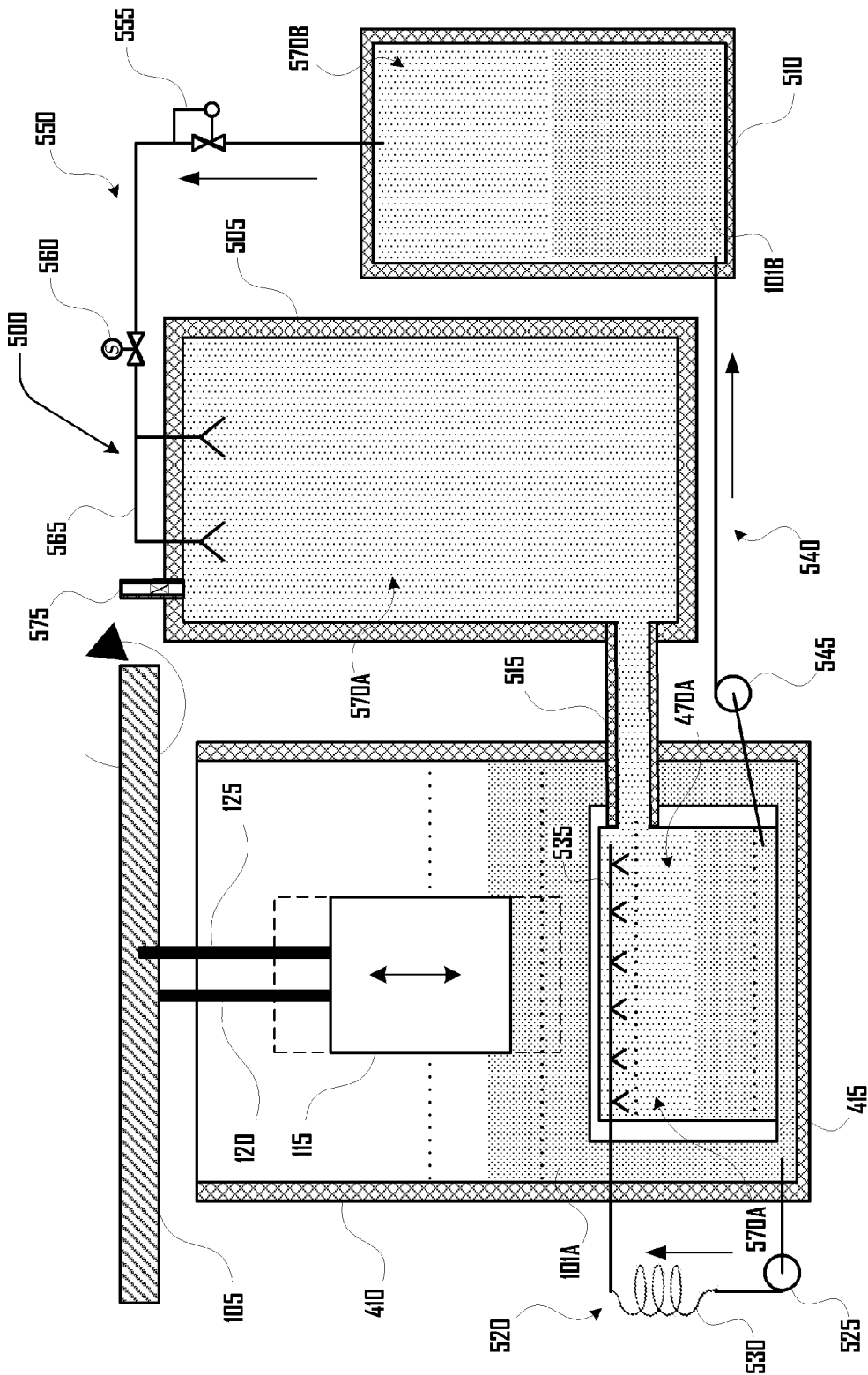
FIG. 5 is an illustration of a reciprocating static water displacement gravity engine powered by steam, in accordance with an embodiment.

FIG. 5 is an illustration of a reciprocating static water displacement gravity engine 500 powered by steam, in accordance with an embodiment. This embodiment 500 includes a displacement chamber 415 with an internal cavity 470 that is fixed in place within a tank 410 that is filled with water 101A and steam 570A. The internal cavity 470 is communicatively connected to a steam chamber 505, via a steam-chamber line 515. Accordingly, a portion of the displacement chamber 415, the steam chamber 505, and the steam-chamber line 515 may collectively hold a volume of steam 570A. Pressure within the steam-chamber 505 may be regulated by a pressure valve 575.

The volume of steam 570A may be selectively increased and decreased so as to displace water 101A within the displacement chamber 415. Changing the volume of steam 570A may be achieved by changing the temperature of the steam 570A by introducing hot steam via hot-sprayers 565 and/or by introducing cold vapor via cold-sprayers 535.

The hot-sprayers 565 may receive steam from a boiler 510, which is connected to the hot-sprayers 565 via a hot-sprayer line 550. The hot-sprayer-line 550 may comprise a steam valve 560, and a pressure-steam regulator 555. The boiler holds steam 570B and water 101B, and may receive water 101A via the boiler-feed line 540. The boiler-feed-line 540 may receive water 101A from within the displacement chamber 415 via a boiler-feed pump 545. Obtaining water 101A from within the displacement chamber 415 may be desirable because this water 101A may already be hot or warm.

Cold vapor may be obtained and/or generated via a cold-vapor system 520, which may include a cold-spray pump 525 and a radiator 530. Water 101A may be obtained outside of the displacement chamber 415, which may be desirable because such water 101A may be cooler than water 101A inside the displacement chamber 415.

As shown FIG. 5, the float 115 may move up and down within the tank 410 in accordance with the change in water level caused by the water displacement within the displacement chamber 415. Accordingly, the float 115 may be raised and lowered within the tank 410 at a desired rate based on the rate at which the volume of steam 570A changes to temperature changes caused by cold and hot vapor introduced by the hot-sprayers 565 and cold-sprayers 535 respectively.

In one embodiment, hot-sprayers 565 and cold-sprayers 535 may be positioned in various locations, which may include within the displacement chamber 415 and/or the steam chamber 505, or the like.

Figure 6:
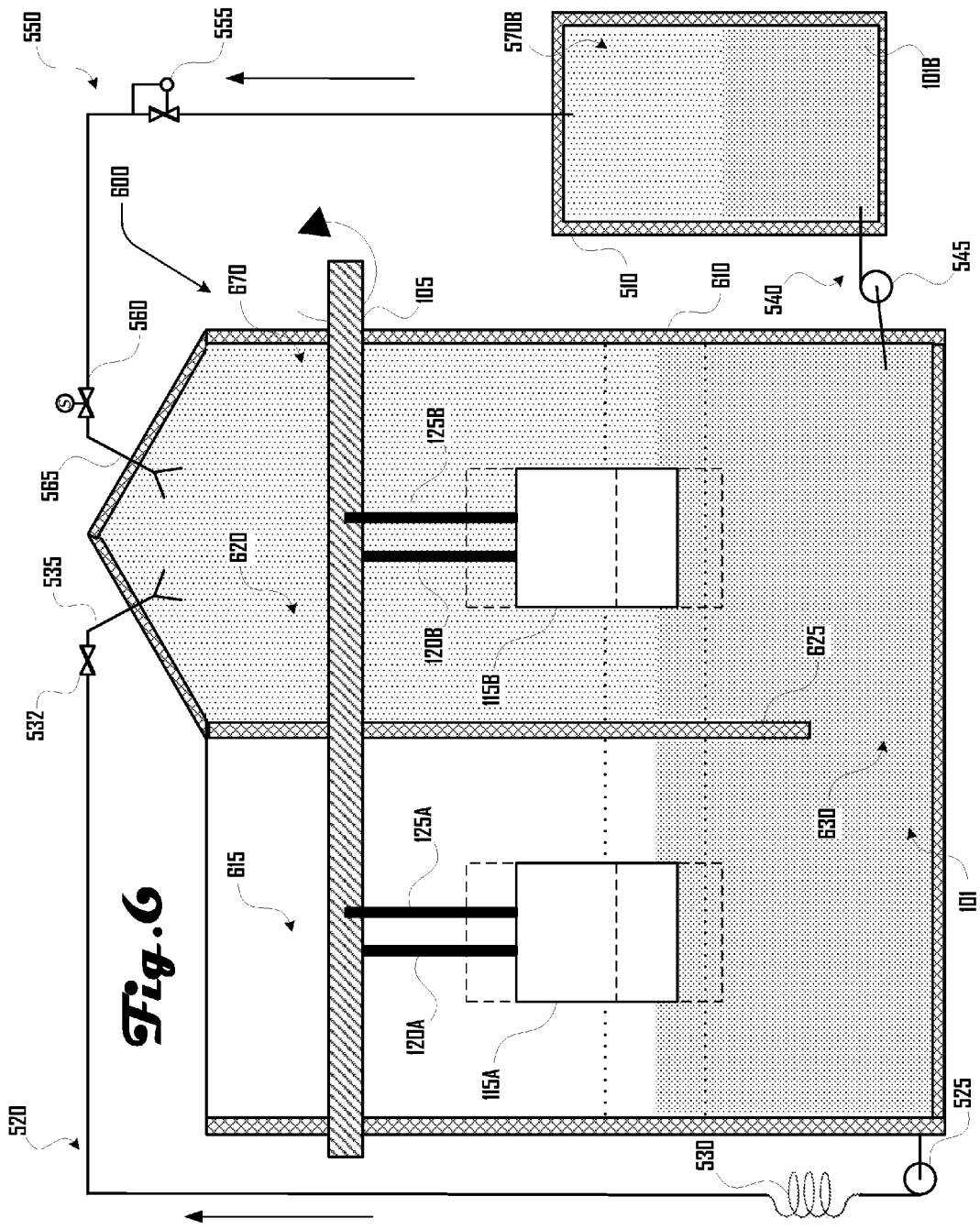
FIG. 6 is an illustration of a tandem-tank reciprocating static water displacement gravity engine powered by steam, in accordance with another embodiment.

FIG. 6 is an illustration of a tandem-tank reciprocating static water displacement gravity engine 600 powered by steam 670, in accordance with another embodiment. A tandem tank 610 comprises a first tank atrium 615, which has an open top, and a second tank atrium 620 which has a closed top. The first and second atrium 615, 620 are separated by a septum 625. Both the first and second atrium 615, 620 are operable to hold a volume of water 101, which translates between the first and second atrium 615, 620 via a passage 630.

The second atrium 620 is operable to hold steam 670, and the volume of steam can be modulated by hot-sprayers 565 and cold-sprayers 535 as discussed above in relation to FIG. 5. Accordingly, as the volume of the steam 670 is increased or decreased, the height of the water 101 in the first and second atrium 615, 620 will raise and lower, and cause the first and second float 115A, 1158 to rise and fall along with the height of the water 101.

For example, FIG. 6 depicts an instance where the heights of the water 101 in the first and second atrium 615, 620 are equal. However, should the volume of steam 670 in the second atrium 620 increase (e.g, via increase in temperature or added steam) the height of water 101 in the second atrium 620 will lower, whereas the height of the water 101 in the first atrium 615 will rise.

Conversely, if the volume of steam 670 in the second atrium 620 should decrease (e.g., due to decrease in temperature or removal of steam), the height of the water 101 in the second atrium 620 will rise, and the height of the water 101 in the first atrium 615 will lower. As discussed herein, the rising and lowering of the first and second floats 115A, 115B due to changes in water height may cause the shaft 105 to rotate.

In one embodiment, there may be a plurality of tanks 610, and in one embodiment, a tank 610 may have any desirable number atriums, and there may be a plurality of open and/or closed atriums.

Additionally, while certain exemplary embodiments shown and described herein are depicted as utilizing one of steam or compressed air, any such embodiments may utilize one or more of either steam or compressed air.

Figure 7:
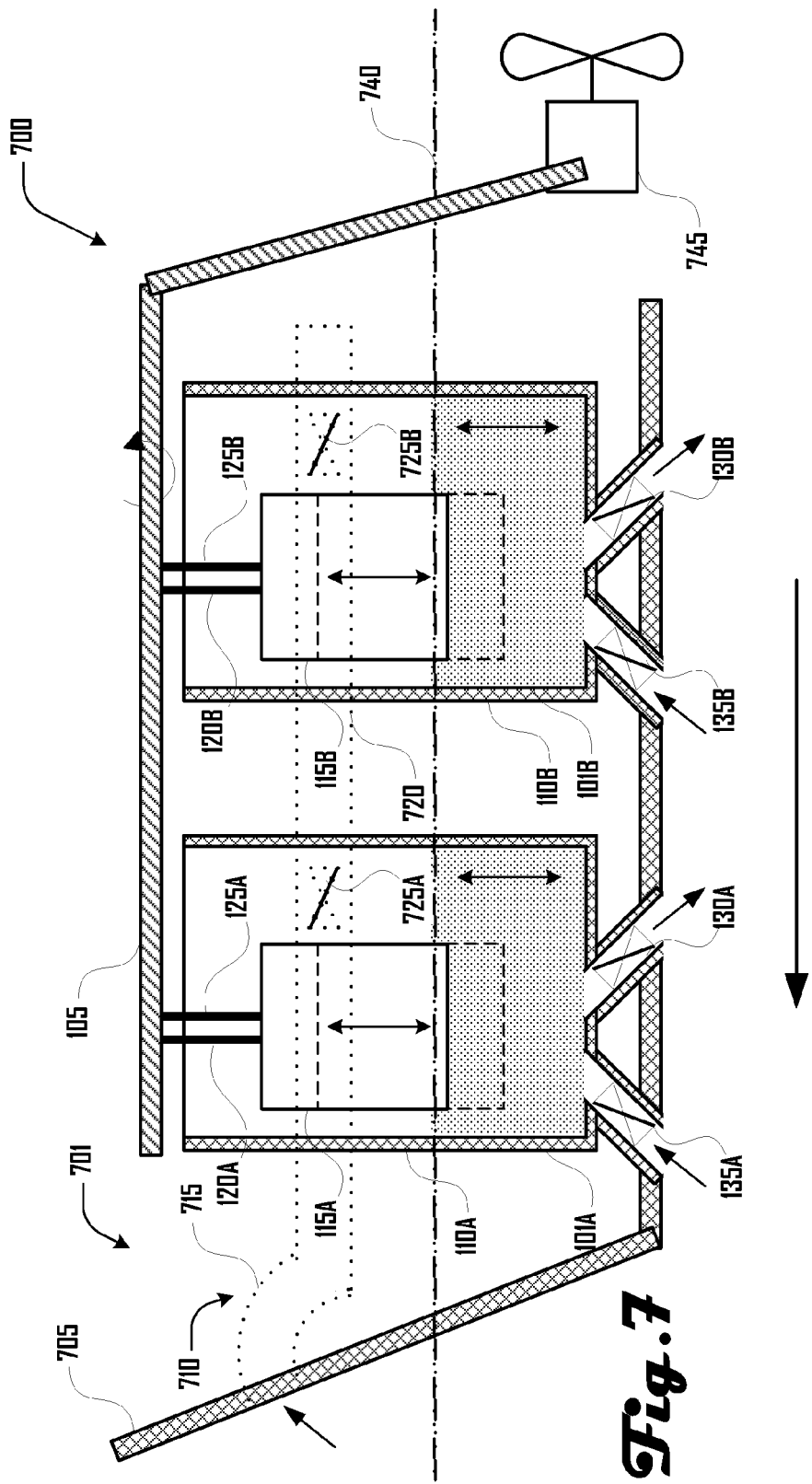
FIG. 7 is a side view of a reciprocating water displacement gravity engine disposed within a vessel in accordance with an embodiment.

FIG. 7 is a side view of a reciprocating water displacement gravity engine disposed 700 within a vessel 701 in accordance with an embodiment. The engine 700 may include a first and second tanks 110A, 1108, which each provide power to a shaft 105 via moving floats 115A, 115B. The shaft 105 may be connected to a propeller 745. Water may be introduced and removed from the tanks 110A, 1108 via respective intake valves 135A, 135B and a released via respective flush valves 130A, 130B.

For example, as the vessel 701 travels forward through the water, water may be forced into the tanks 110A, 1108 though the respective open intake valves 135A, 135B, which causes the water level in the tanks 110A, 1108 to rise. The intake valves 135A, 135B may then be closed and the flush valves 130A, 130B may then be opened so that water leaves the tanks 110A, 1108. Accordingly, the water level within the tanks 110A, 1108 may be raised and lowered by selective opening and closing of the intake valves 135A, 135B and flush valves 130A, 130B.

Additionally, water may also be introduced into the tanks 110A, 1108 via scoop injection. For example, as the vessel 701 travels through the water, water may be forced up the hull 705 of vessel 701 and above the water line 740. Water may enter the vessel 701 through a curved scoop intake 715 at the front of the vessel 701 and travel down a supply pipe 720, where the water may selectively enter the tanks 110A, 1108 via scoop-pipe valves 725A, 725B. Accordingly, water may also or alternatively be introduced into the tanks 110A, 1108 via scoop injection.

Figure 8:
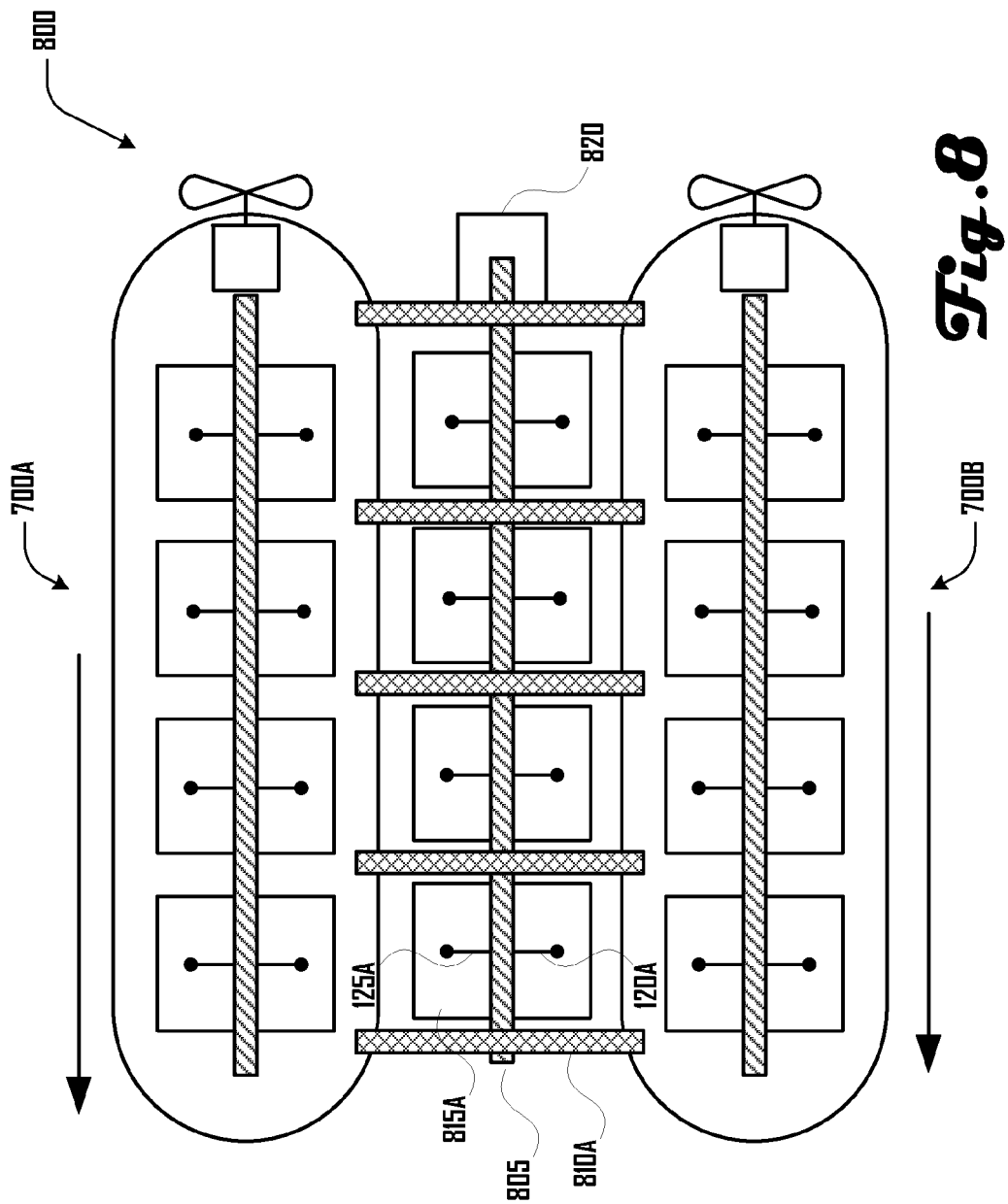
FIG. 8 is a side view of a reciprocating water displacement gravity pontoon vessel in accordance with an embodiment.

FIG. 8 is a side view of a reciprocating water displacement gravity pontoon vessel 800 in accordance with an embodiment. The pontoon vessel comprises first and second water displacement gravity engines 700A, 700B disposed on each side of the pontoon vessel 800. The gravity engines 700A, 700B may be held by a plurality of spacers 810A, and the space between the gravity engines 700A, 700B may be exposed to open water. A plurality of floats 815A may float on the water, and move up and down with the waves or other undulations of the water. This up and down movement of the floats 815A may turn a shaft 805 as discussed herein, which may power a generator 820.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A system comprising:
   an elongated shaft having a central axis;
   a first and second ratchets coupled to the shaft, each operable to apply torque to the shaft in substantially the same direction such that the shaft rotates about the central axis;
   an elongated pull-rod coupled to the first ratchet at a first pull-rod end;
   an elongated push-rod coupled to the second ratchet at a first push-rod end;
   a tank operable to hold a volume of fluid;
   a float disposed within the tank operable to float within the volume of fluid at a float-level, the pull-rod and push-rod being coupled with the float at a second pull-rod end and a second push-rod end respectively; and
   a displacement chamber disposed within the tank, the displacement chamber having a first cavity-portion wherein the fluid is operable to communicatively reside, and a second cavity-portion wherein a second fluid volume is operable to reside, the second fluid having a lower density than the first fluid.

2. The system of claim 1, wherein the float-level is operable to operable to raise and lower and thereby cause the float to raise and lower within the tank.

3. The system of claim 2, wherein raising the float causes torque to be applied to shaft via the push-rod and second ratchet.

4. The system of claim 2, wherein lowering the float causes torque to be applied to shaft via the pull-rod and first ratchet.

5. The system of claim 2, wherein the float-level is operable to operable to raise and lower via fluid being introduced to and removed from the tank.

6. The system of claim 5, wherein fluid is introduced into the tank via an inlet-valve, wherein fluid is removed from the tank via a flush-valve, and wherein the inlet-valve is positioned at a higher elevation than the flush-valve.

7. The system of claim 5, wherein fluid is introduced into the tank via an inlet-valve, wherein fluid is removed from the tank via a flush-valve, and wherein the inlet-valve and flush-valve are positioned on the bottom of the tank.

8. The system of claim 1, wherein changing the volume of the second fluid volume is operable to raise and lower the float-level.

9. The system of claim 8, wherein the second fluid is substantially a gas.

10. The system of claim 9, wherein changing the volume of the second fluid comprises introducing gas via a compressor.

11. The system of claim 8, wherein the second fluid is substantially steam.

12. The system of claim 11, wherein changing the volume of the second fluid comprises changing the temperature of the steam.

13. The system of claim 12, wherein changing the temperature of the steam comprises sequentially introducing a first and second fluid-injection into the chamber-cavity, wherein the first and second fluid-injection respectively comprise fluid having substantially different temperature.

14. The system of claim 1, wherein the shaft is connected to a vehicle propeller.

15. The system of claim 1, wherein the shaft is connected to an electrical generator.

* * * * *